US010989268B2

(12) United States Patent
Oliveira et al.

(10) Patent No.: US 10,989,268 B2
(45) Date of Patent: Apr. 27, 2021

(54) DAMPER WITH HYDRAULIC END STOP

(71) Applicant: Tenneco Automotive Operating Company Inc., Lake Forest, IL (US)

(72) Inventors: Diego Alves de Oliveira, Monroe, MI (US); Nirupam Kar, Ann Arbor, MI (US); Matthew Ryan Schelosky, Monroe, MI (US); Matthew Roessle, Temperance, MI (US)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 16 days.

(21) Appl. No.: 16/509,731

(22) Filed: Jul. 12, 2019

(65) Prior Publication Data
US 2021/0010559 A1    Jan. 14, 2021

(51) Int. Cl.
*F16F 9/36* (2006.01)
*B60G 13/08* (2006.01)
*F16F 9/58* (2006.01)
*F16F 9/49* (2006.01)

(52) U.S. Cl.
CPC .............. *F16F 9/364* (2013.01); *B60G 13/08* (2013.01); *F16F 9/366* (2013.01); *F16F 9/49* (2013.01); *F16F 9/585* (2013.01)

(58) Field of Classification Search
CPC .. F16F 9/362; F16F 9/364; F16F 9/365; F16F 9/366; F16F 9/49; F16F 9/585
See application file for complete search history.

(56) References Cited

U.S. PATENT DOCUMENTS

| 3,920,253 | A | | 11/1975 | Bauer | |
|---|---|---|---|---|---|
| 6,003,848 | A | * | 12/1999 | Cotter | F16F 9/362 |
| | | | | | 267/64.11 |
| 9,593,697 | B2 | * | 3/2017 | Baalmann | F16F 9/49 |

(Continued)

FOREIGN PATENT DOCUMENTS

| CN | 101782127 | 3/2013 |
|---|---|---|
| DE | 102014203598 | 8/2015 |

(Continued)

OTHER PUBLICATIONS

Notice of Transmittal of the International Search Report and the Written Opinion of the International Searching Authority for Counterpart PCT/US2020/041500, 14 Pages, dated Oct. 20, 2020.

*Primary Examiner* — Thomas W Irvin
(74) *Attorney, Agent, or Firm* — McGarry Bair PC

(57) ABSTRACT

A damper includes a pressure tube and a piston. The piston defines a rebound chamber and a compression chamber. The damper further includes a piston rod that reciprocates with the piston. The damper includes a sealing ring slidably disposed around the piston rod. The sealing ring includes a locking mechanism adapted to lock the sealing ring around the piston rod. The sealing ring also includes an inner surface having a plurality of concave surfaces and a plurality of convex surfaces. Each of the plurality of concave surfaces is located adjacent to a corresponding convex surface of the plurality of convex surfaces. The sealing ring further includes an upper surface extending between the outer and inner surfaces. The upper surface defines a plurality of channels. The sealing ring further includes grooves and bleeds for tuning energy dissipated by the damper during rebound stroke to help reduction of noise.

10 Claims, 13 Drawing Sheets

(56) References Cited

U.S. PATENT DOCUMENTS

| | | | |
|---|---|---|---|
| 9,835,220 B2 | 12/2017 | Kontny et al. | |
| 10,371,226 B2 * | 8/2019 | Bruno | F16F 9/185 |
| 2006/0219507 A1 * | 10/2006 | Drott | B60T 11/236 |
| | | | 188/322.17 |
| 2007/0246892 A1 | 10/2007 | Andersson et al. | |
| 2014/0360353 A1 * | 12/2014 | Baalmann | F16F 9/49 |
| | | | 92/143 |
| 2015/0090548 A1 * | 4/2015 | Yamanaka | F16F 9/3271 |
| | | | 188/297 |
| 2015/0369367 A1 | 12/2015 | Kuroki | |
| 2016/0091046 A1 | 3/2016 | Soromenho | |
| 2017/0009840 A1 * | 1/2017 | Hertz | F16F 9/19 |
| 2019/0154104 A1 * | 5/2019 | Kontny | F16F 9/366 |

FOREIGN PATENT DOCUMENTS

| | | |
|---|---|---|
| DE | 102015223581 | 6/2017 |
| DE | 102016207324 | 11/2017 |
| JP | 2011214639 A | 10/2011 |
| JP | 6526937 B1 | 6/2019 |
| WO | 2016146660 | 9/2016 |
| WO | 2018103982 | 6/2018 |

\* cited by examiner

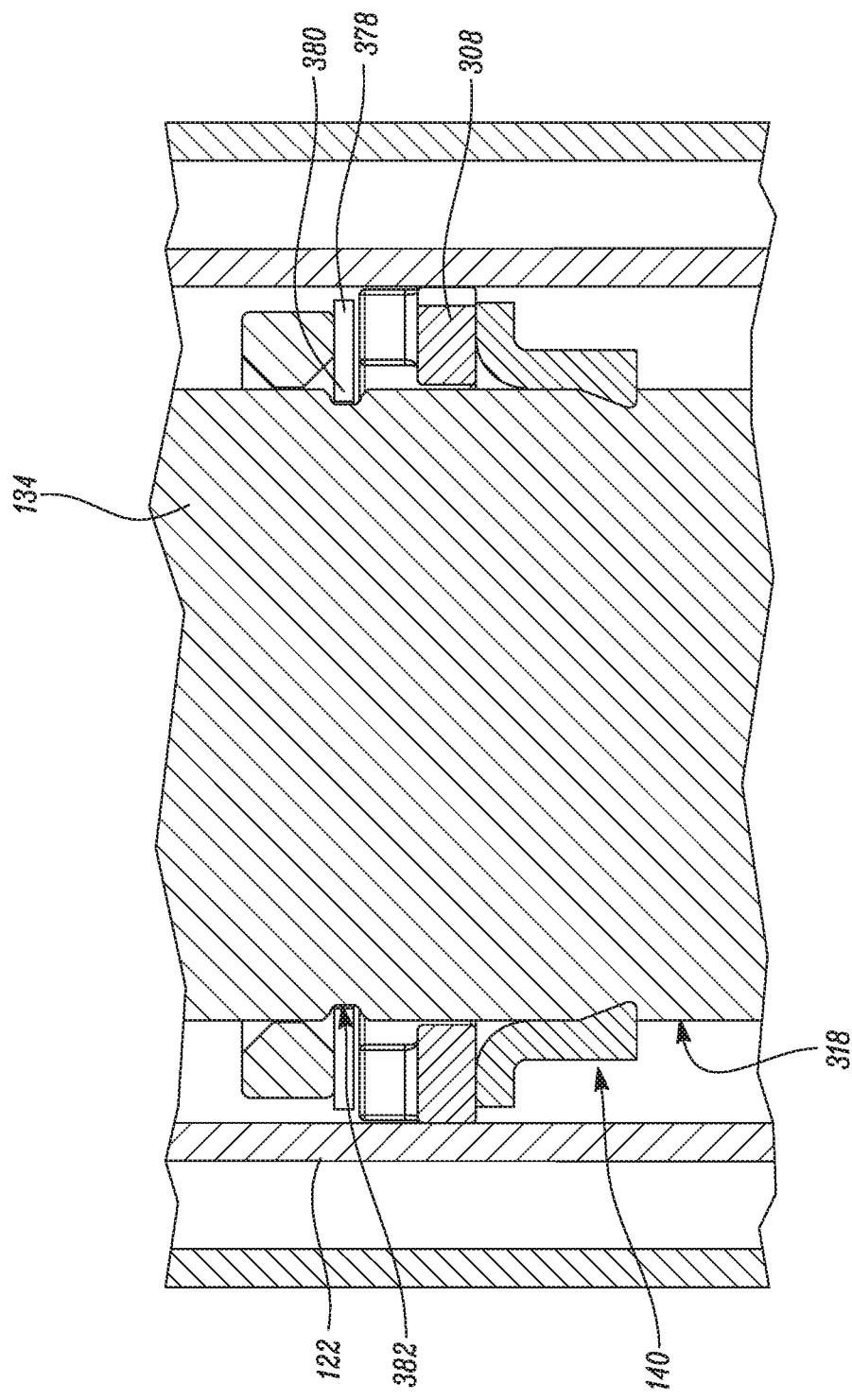

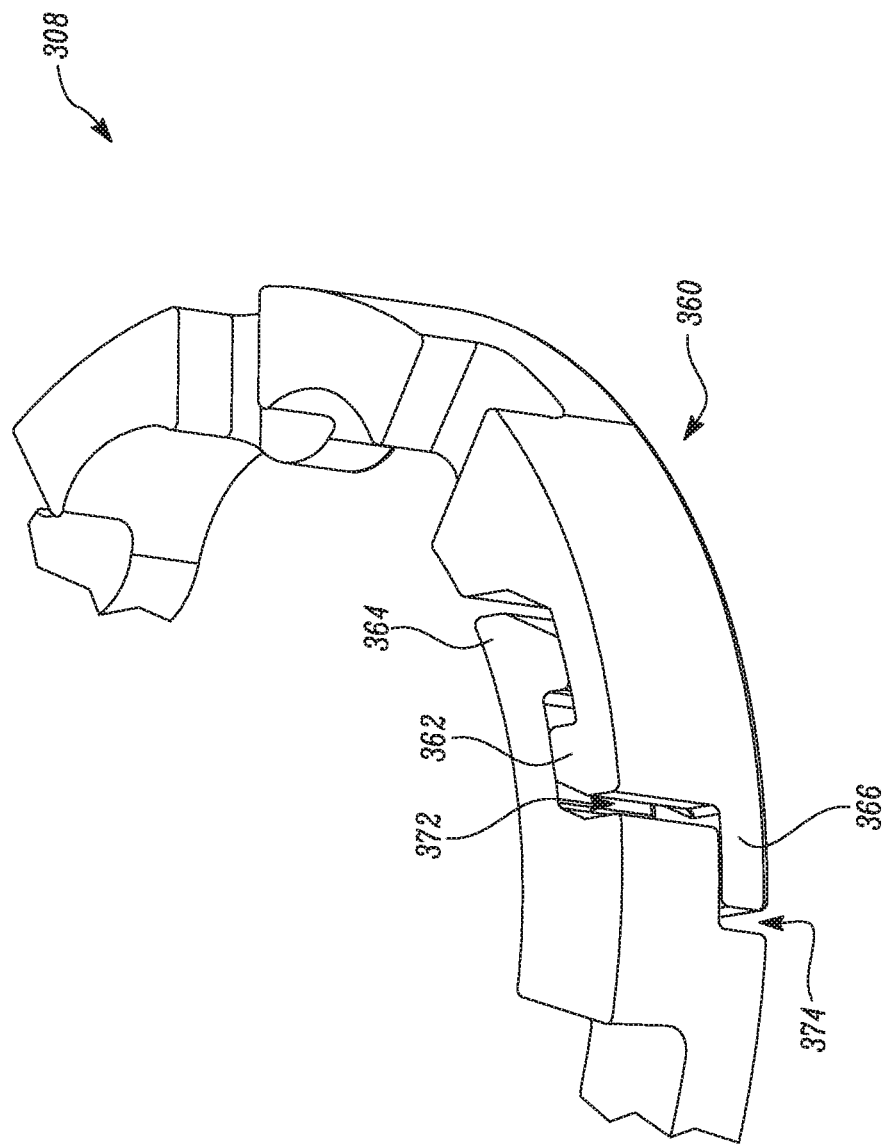

DAMPER WITH HYDRAULIC END STOP

TECHNICAL FIELD

The present disclosure generally relates to dampers. More particularly, the present disclosure relates to a damper having a hydraulic end stop.

BACKGROUND

Shock absorbers/dampers are generally installed on different types of equipment, such as vehicles, to damp vibrations during operation. For example, dampers are generally connected between a body and the suspension system of the vehicle in order to absorb the vibrations. Conventional dampers typically include a pressure tube, a reserve tube, a piston, a piston rod, and one or more valves. During a compression stroke and a rebound stroke of the damper, the piston may limit a flow of damping fluid between working chambers defined within a body of the damper due to which the damper produces a damping force for counteracting the vibrations. By further restricting the flow of damping fluid within the working chambers of the damper, greater damping forces may be generated by the damper.

For reasons relating to comfort, the damping force of the damper cannot be increased beyond a certain threshold as it may cause an axle of the vehicle and the damper to move into a rebound limit at high speeds. A hydraulic rebound end stop is typically provided to reduce the speed at which the damper moves into the rebound limit. Current hydraulic rebound end stop designs utilize a sealing ring, such as a brass sealing ring, with a controlled gap. When such sealing rings enter a hydraulic rebound stop zone towards an end of the rebound stroke, a high damping force is created that causes dissipation of kinetic energy and helps in reduction of noise. Under certain conditions, for example, when the sealing ring is outside the hydraulic rebound stop zone or in a transition zone, high velocity of oil flowing around the sealing ring forces the sealing ring to plastically deform and open up. Such unlocking of the sealing ring may cause the sealing ring to fail and may in turn affect hydraulic rebound end stop function of the damper and binding in the damper.

SUMMARY

In an aspect of the present disclosure, a damper is provided. The damper includes a pressure tube defining a first end and a second end opposite to the first end. The damper also includes a piston slidably disposed within the pressure tube. The piston defines a rebound chamber and a compression chamber within the pressure tube. The damper further includes a piston rod adapted to reciprocate with the piston. The piston rod is partially received within the pressure tube. The damper includes a sealing ring slidably disposed around the piston rod. The sealing ring includes an inner surface facing the piston rod. The inner surface includes a plurality of concave surfaces and a plurality of convex surfaces. Each of the plurality of concave surfaces is located adjacent to a corresponding convex surface of the plurality of convex surfaces. The sealing ring also includes an upper surface extending between the outer and inner surfaces. The upper surface defines a plurality of channels.

In another aspect of the present disclosure, a damper is provided. The damper includes a pressure tube defining a first end and a second end opposite to the first end. The damper also includes a piston slidably disposed within the pressure tube. The piston defines a rebound chamber and a compression chamber within the pressure tube. The damper further includes a piston rod adapted to reciprocate with the piston. The piston rod is partially received within the pressure tube. The damper includes a first collar disposed around the piston rod. The damper also includes a second collar disposed around the piston rod and axially spaced apart from the first collar. The damper further includes a sealing ring slidably disposed around the piston rod and disposed between the first and second collars. The sealing ring includes an inner surface facing the piston rod. The inner surface includes a plurality of concave surfaces and a plurality of convex surfaces. Each of the plurality of concave surfaces is located adjacent to a corresponding convex surface of the plurality of convex surfaces. The sealing ring also includes an outer surface opposite to the inner surface. The outer surface defines at least one groove. The sealing ring further includes an upper surface extending between the outer and inner surfaces. The upper surface defines a plurality of channels.

In yet another aspect of the present disclosure, a damper is provided. The damper includes a pressure tube defining a first end and a second end opposite to the first end. The damper also includes a piston slidably disposed within the pressure tube. The piston defines a rebound chamber and a compression chamber within the pressure tube. The damper further includes a piston rod adapted to reciprocate with the piston. The piston rod is partially received within the pressure tube. The damper includes a first collar disposed around the piston rod. The damper also includes a second collar disposed around the piston rod and axially spaced apart from the first collar. The damper further includes a snap ring disposed adjacent to the second collar and extending along a circumference of the piston rod. The snap ring is at least partially received within a ring groove of the piston rod. The damper includes a sealing ring slidably disposed around the piston rod and disposed between the first and second collars. The sealing ring includes an inner surface facing the piston rod. The inner surface includes a plurality of concave surfaces and a plurality of convex surfaces. Each of the plurality of concave surfaces is located adjacent to a corresponding convex surface of the plurality of convex surfaces. The sealing ring also includes an outer surface opposite to the inner surface. The outer surface defines at least one groove. The sealing ring further includes an upper surface extending between the outer and inner surfaces. The upper surface defines a plurality of channels.

Other features and aspects of this disclosure will be apparent from the following description and the accompanying drawings.

BRIEF DESCRIPTION OF DRAWINGS

FIG. 3B is a cross-sectional view illustrating another design of a first collar associated with the damper of FIG. 2;

FIG. 4D is a perspective view of a portion of the sealing ring of FIG. 4A illustrating a locking mechanism;

Wherever possible, the same reference numbers will be used throughout the drawings to refer to same or like parts.

DETAILED DESCRIPTION

Figure 1:
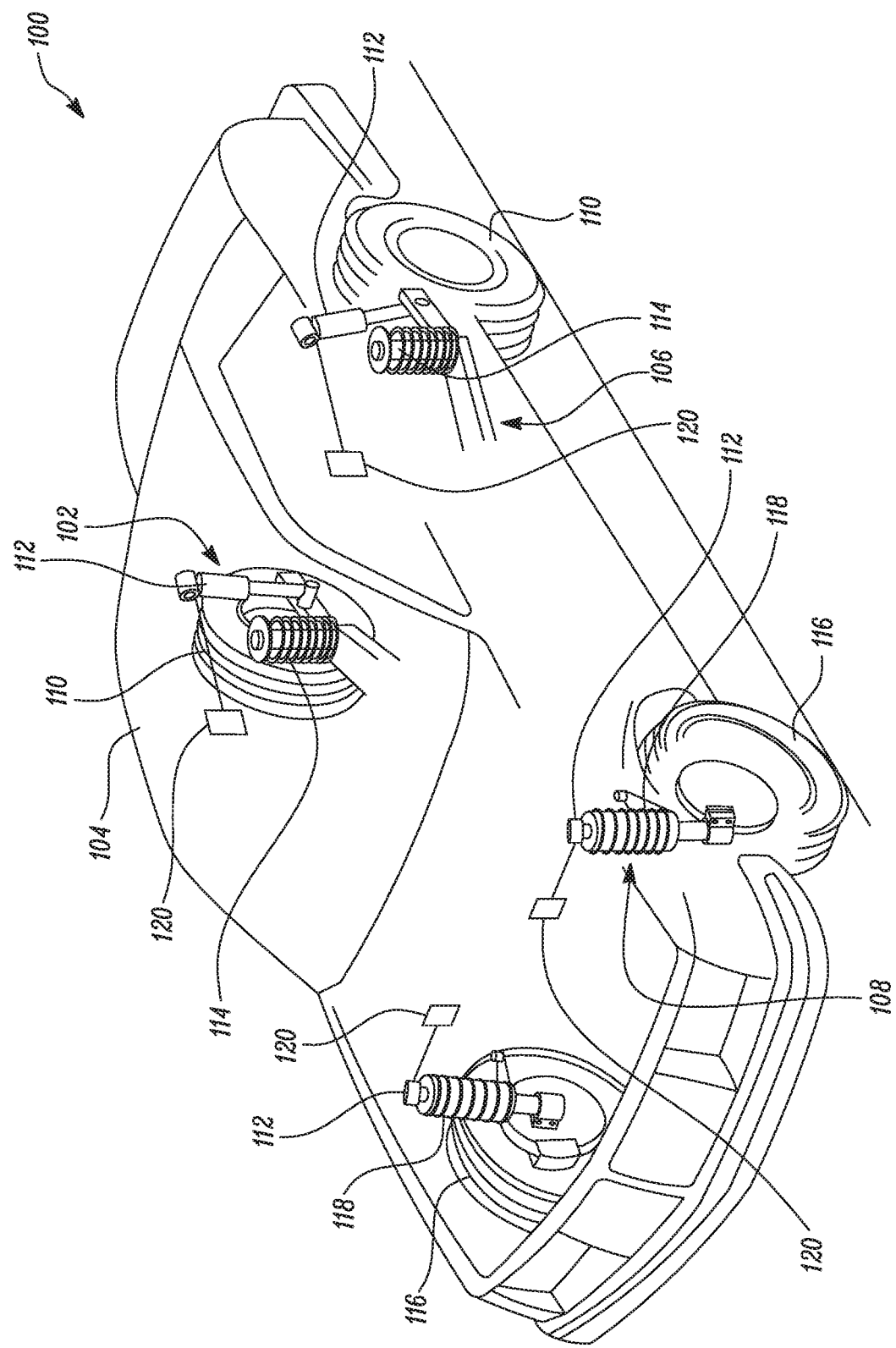
FIG. 1 is an illustration of a vehicle incorporating a suspension system, according to an aspect of the present disclosure.

FIG. 1 illustrates an exemplary vehicle 100 incorporating a suspension system 102 in accordance with the present disclosure. The vehicle 100 may include a vehicle driven by an internal combustion engine, an electric vehicle, or a hybrid vehicle. The vehicle 100 includes a body 104. The suspension system 102 of the vehicle 100 includes a rear suspension 106 and a front suspension 108.

The rear suspension 106 includes a transversely extending rear axle assembly (not shown) adapted to operatively support a pair of rear wheels 110. The rear axle assembly is operatively connected to the body 104 by means of a pair of dampers 112 and a pair of helical coil springs 114. Similarly, the front suspension 108 includes a transversely extending front axle assembly (not shown) which operatively supports a pair of front wheels 116. The front axle assembly is operatively connected to the body 104 by means of another pair of the dampers 112 and a pair of helical coil springs 118. In an alternative example, the vehicle 100 may include an independent suspension unit (not shown) for each of the four corners instead of front and rear axle assemblies.

The dampers 112 of the suspension system 102 serve to damp relative movement of the unsprung portion (i.e., the front and rear suspensions 108, 106) and the sprung portion (i.e., the body 104) of the vehicle 100. While the vehicle 100 has been depicted as a passenger car, the dampers 112 may be used with other types of vehicles or any equipment that requires damping. Examples of vehicles include buses, trucks, off-road vehicles, and so forth. Furthermore, the term "damper" as used herein will refer to dampers in general and will include shock absorbers, McPherson struts, and semi-active and active suspensions.

In order to automatically adjust each of the dampers 112, an electronic controller 120 is electrically connected to the dampers 112. The controller 120 is used for controlling an operation of each of the dampers 112 in order to provide appropriate damping characteristics resulting from movements of the body 104 of the vehicle 100. Further, the controller 120 may independently control each of the dampers 112 in order to independently regulate a damping level of each of the dampers 112. The controller 120 may be electrically connected to the dampers 112 via wired connections, wireless connections, or a combination thereof. In examples, each of the dampers 112 may include a dedicated electronic controller that may be located onboard the respective damper 112. Further, the functionalities of the controller 120 may be performed by an Electronic Control Unit (ECU) of the vehicle 100.

The controller 120 may independently adjust the damping level or characteristic of each of the dampers 112 to optimize a riding performance of the vehicle 100. The term "damping level", as used herein, refers to a damping force produced by each of the dampers 112 to counteract movements or vibrations of the body 104. A higher damping level may correspond to a higher damping force. Similarly, a lower damping level may correspond to a lower damping force. Such adjustments of the damping levels may be beneficial during braking and turning of the vehicle 100. The controller 120 may include a processor, a memory, Input/Output (I/O) interfaces, communication interfaces, and other components. The processor may execute various instructions stored in the memory for carrying out various operations of the controller 120. The controller 120 may receive and transmit signals and data through the I/O interfaces and the communication interfaces. Further, the controller 120 may include microcontrollers, application-specific integrated circuits (ASICs), field programmable gate arrays (FPGAs), and so forth.

Figure 2:
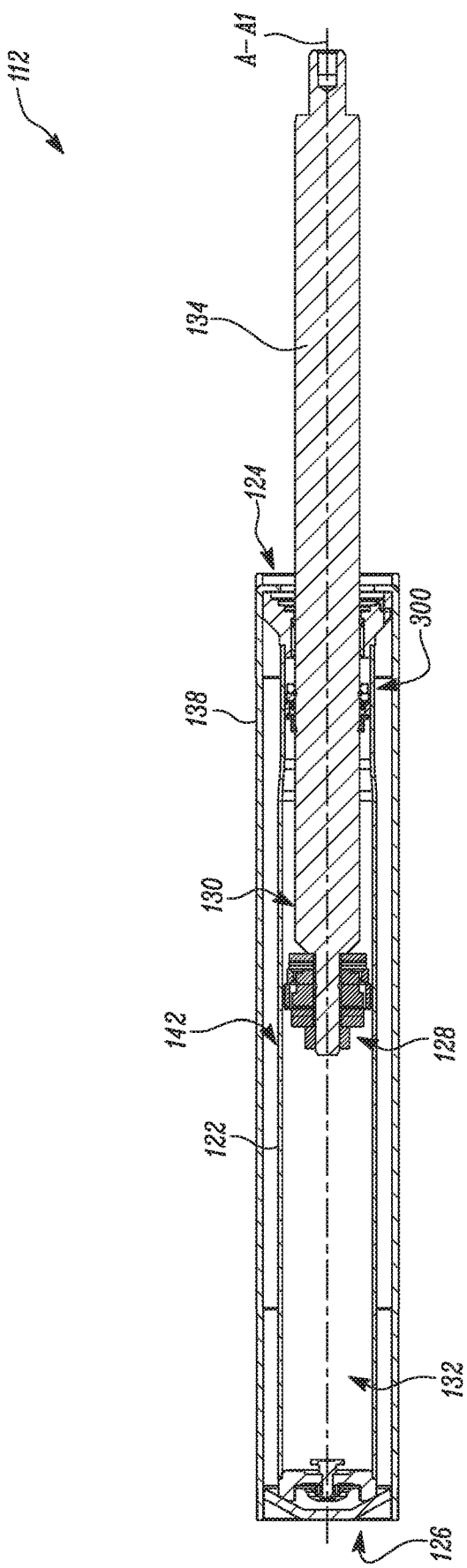
FIG. 2 is a cross-sectional view of a damper associated with the suspension system of FIG. 1, according to an aspect of the present disclosure.

FIG. 2 illustrates a cross-sectional view of the damper 112. The damper 112 may be any of the four dampers 112 of the vehicle 100. The damper 112 may include a Continuously Variable Semi-Active Suspension system (CVSA) damper or a shock absorber, without any limitations. In the illustrated example, the damper 112 is a double-tube damper. Alternatively, the damper 112 may include a mono-tube damper. The damper 112 may contain a fluid which can be a hydraulic fluid or oil. The damper 112 includes a pressure tube 122 defining a first end 124 and a second end 126 opposite to the first end 124. The pressure tube 122 is embodied as a monolithic pressure tube. The pressure tube 122 may be further embodied as a substantially cylindrical tube with open ends.

A piston 128 is slidably disposed within the pressure tube 122. The piston 128 defines a rebound chamber 130 and a compression chamber 132 within the pressure tube 122. The rebound chamber 130 is proximal to the first end 124, while the compression chamber 132 is distal to the first end 124. Each of the rebound and compression chambers 130, 132 contains the fluid therein. A volume of each of the rebound and compression chambers 130, 132 varies based on a reciprocating motion of the piston 128. Additionally, a pair of piston valves (not shown) may be disposed within the piston 128 to regulate fluid flow between the rebound and compression chambers 130, 132. More particularly, the piston valves may maintain desired pressures in each of the rebound and compression chambers 130, 132.

Further, the piston 128 is connected to the body 104 of the vehicle 100 by a piston rod 134. The piston rod 134 is coupled to the piston 128. The piston rod 134 is adapted to reciprocate with the piston 128. Further, the piston rod 134 is partially received within the pressure tube 122. The piston rod 134 extends through the first end 124 of the pressure tube 122. The damper 112 also includes a piston rod guide assembly 136 (see FIG. 3A) disposed proximal to the first end 124 of the pressure tube 122. A movement of the piston rod 134 is axially limited proximal to the first end 124 by the piston rod guide assembly 136.

In some examples, the damper 112 may include a base valve (not shown). The base valve may be disposed proximal to the second end 126 of the pressure tube 122. The base valve may allow fluid flow between the compression chamber 132 and a reserve chamber 142. Further, at least one of the piston valves and the base valve may be electronically controlled by the controller 120 (shown in FIG. 1) such that the controller 120 may regulate the piston valves and the base valve in order to control the damping level of the damper 112.

The damper 112 also includes a reserve tube 138 disposed around the pressure tube 122. In some examples, the reserve tube 138 is concentrically disposed around the pressure tube 122. The reserve tube 138 defines the reserve chamber 142. Specifically, the reserve chamber 142 is disposed between the pressure tube 122 and the reserve tube 138. The reserve chamber 142 may be in fluid communication with an external fluid reservoir (not shown), such as an accumulator. Further, the damper 112 may include a valve assembly (not shown) that provides fluid communication between the reserve chamber 142 and the external fluid reservoir. In such examples, the valve assembly may regulate a flow of fluid between the reserve chamber 142 and the external fluid reservoir. The valve assembly may be electronically controlled by the controller 120.

Figure 3A:
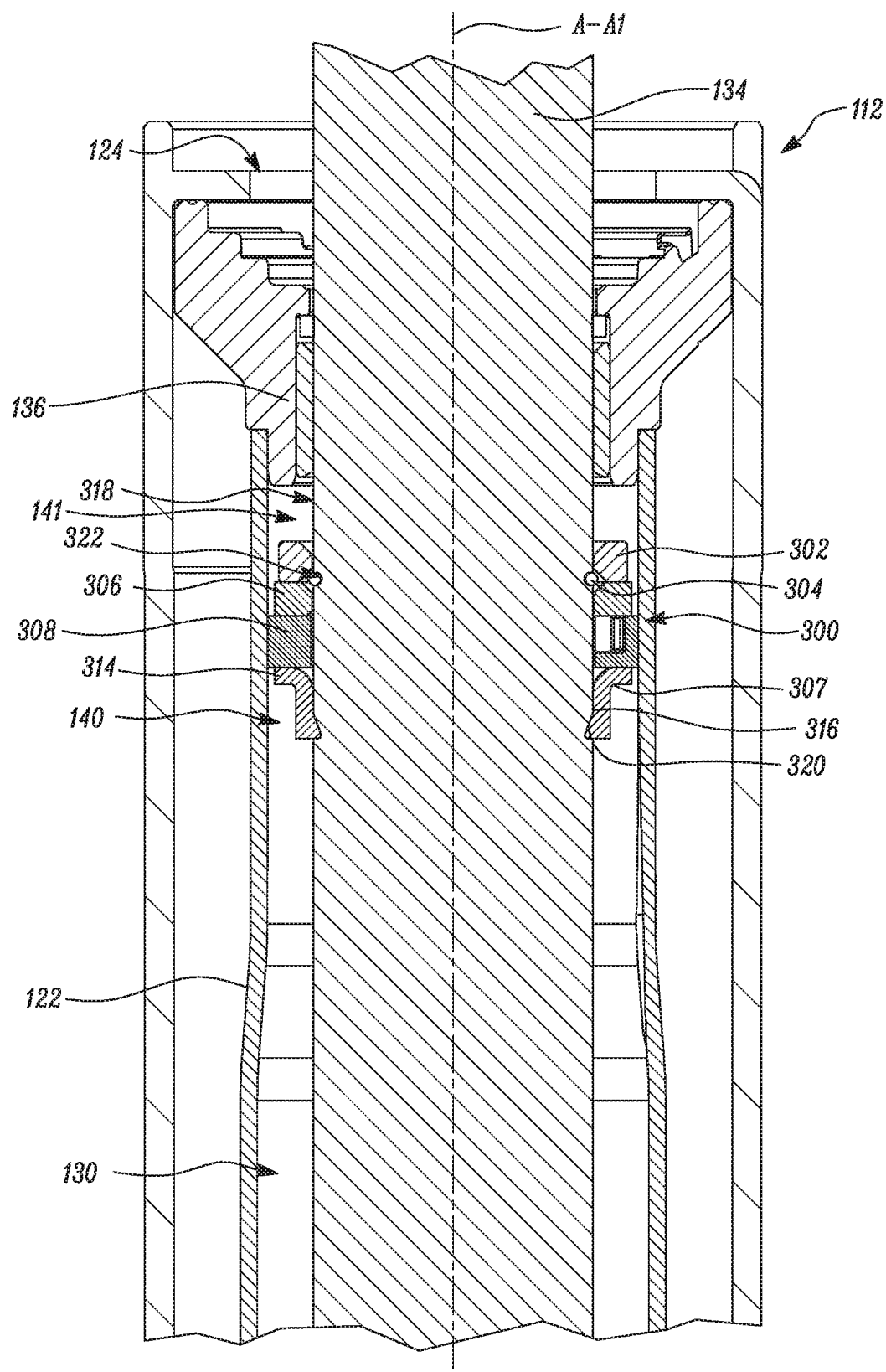
FIG. 3A is another cross-sectional view illustrating a detailed view of the damper of FIG. 2.

Referring now to FIG. 3A, the damper 112 includes a hydraulic rebound end stop system 300 disposed proximal to the first end 124 of the damper 112. The hydraulic rebound end stop system 300 includes a rebound bumper 302, a snap ring 304, a first collar 306, a sealing ring 308, and a second collar 307. The damper 112 includes the rebound bumper 302. The rebound bumper 302 may embody an annular member made from plastic, a polymer, an elastic material, or a metal which defines a through bore (not shown) through which the piston rod 134 extends. The rebound bumper 302 may be received within a space 140 defined between the piston rod 134 and the pressure tube 122. The rebound bumper 302 surrounds the piston rod 134. In an example, the rebound bumper 302 may be disposed around the piston rod 134 by a snap fit arrangement. In some examples, the rebound bumper 302 may be compressed when the piston 128 moves towards the first end 124 during the rebound stroke or when the piston 128 is in a full rebound condition against the rebound bumper 302.

Further, the damper 112 includes the first collar 306. The first collar 306 is disposed around the piston rod 134 and adjacent to the rebound bumper 302. The first collar 306 is embodied as an annular ring disposed around the piston rod 134 that defines a through opening (not shown) to receive the piston rod 134 therethrough. The first collar 306 includes a planar upper surface (not shown) and a planar lower surface (not shown) disposed opposite to the upper surface. The upper surface faces the rebound bumper 302 whereas the lower surface faces the sealing ring 308. The first collar 306 may be made of a plastic, a polymer, or a metal. In an example, the first collar 306 is slidable along an axis "A-A1" defined by the damper 112. Moreover, the damper 112 includes the second collar 307 that is disposed around the piston rod 134 and axially spaced apart from the first collar 306. The second collar 307 includes a substantially L-shaped cross-section defining a first portion 314, a second portion 316, and a through opening (not shown) to receive the piston rod 134 therethrough. The second portion 316 of the second collar 307 contacts an outer surface 318 of the piston rod 134. Further, the second portion 316 defines an extension 320 that allows the second collar 307 to be crimped with the piston rod 134 for connecting the second collar 307 to the piston rod 134. Thus, the second collar 307 is fixedly coupled to the piston rod 134 and does not slide along the axis "A-A1". The second collar 307 may be made of a plastic, a polymer, or a metal.

Further, the damper 112 includes the snap ring 304 that is disposed adjacent to the second collar 307 and extends along a circumference of the piston rod 134. The snap ring 304 is at least partially received within a ring groove 322 of the piston rod 134. The ring groove 322 is defined on the outer surface 318 of the piston rod 134. In an assembled condition of the damper 112, the first collar 306 and the sealing ring 308 are disposed between the snap ring 304 and the second collar 307, such that the first collar 306 and the sealing ring 308 are movable between the snap ring 304 and the second collar 307 based on the movement of the piston rod 134. The snap ring 304 is embodied as an annular ring and may be made of a suitable material. For example, the snap ring 304 may be made of metal or metal alloys.

FIG. 3B illustrates another design of a first collar 378 associated with the damper 112. In this example, the first collar 378 includes an extending portion 380 provided on an inner surface of the first collar 378. For example, the extending portion may include a ring extending from the inner surface of the first collar 378 and may be received within a groove 382 provided on the outer surface 318 of the piston rod 134. In an example, the extending portion 380 may include a flexible pad. Such an optimized design of the first collar 378 may eliminate the requirement of the snap ring 304 (shown in FIG. 3A). Further, the first collar 378 may also reduce a dead length of the damper 112, which may in turn reduce an overall cost of the damper 112.

Figure 3C:
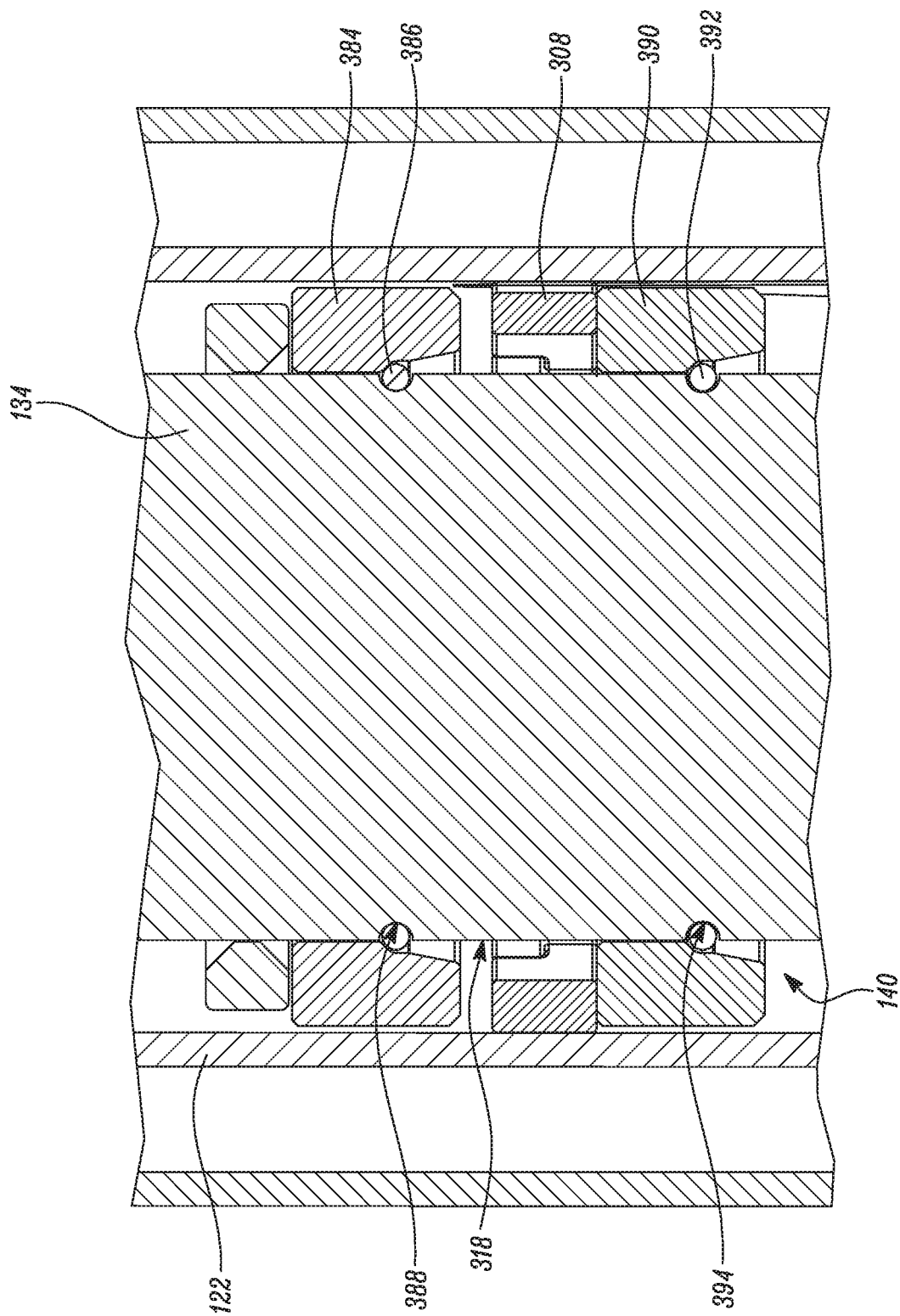
FIG. 3C is a cross-sectional view illustrating yet another design of a first collar associated with the damper of FIG. 2.

FIG. 3C illustrates yet another design of a first collar 384 associated with the damper 112. In this example, the first collar 384 is press-fitted or loose-fitted over a first snap ring 386. The piston rod 134 defines a first ring groove 388 provided on the outer surface 318 of the piston rod 134. Further, the first snap ring 386 is received within the first ring groove 388. Additionally, a second collar 390 of the damper 112 is press-fitted or loose-fitted over a second snap ring 392. The piston rod 134 defines a second ring groove 394 provided on the outer surface 318 of the piston rod 134. The second snap ring 392 is received within the second ring groove 394. Thus, the second collar 390 does not include an extension similar to the extension 320 associated with the second collar 307 shown in FIG. 3A. Further, the first and second snap rings 386, 394 are similar to the snap ring 304 illustrated in FIG. 3A. The design of the first and second collars 384, 390 illustrated herein can be used in damper applications with high level topping loads, which may prevent transmission of topping loads to the sealing ring 308.

The damper 112 also includes the sealing ring 308 slidably disposed around the piston rod 134. More particularly, the sealing ring 308 is slidably disposed around the piston rod 134 and disposed between the first and second collars 306, 307. In some examples, the sealing ring 308 is disposed such that an axial gap (not shown) exists between the sealing ring 308 and the first collar 306 to allow some amount of fluid flow through the axial gap. The sealing ring 308 may be made of a plastic or a polymer.

Figure 4A:
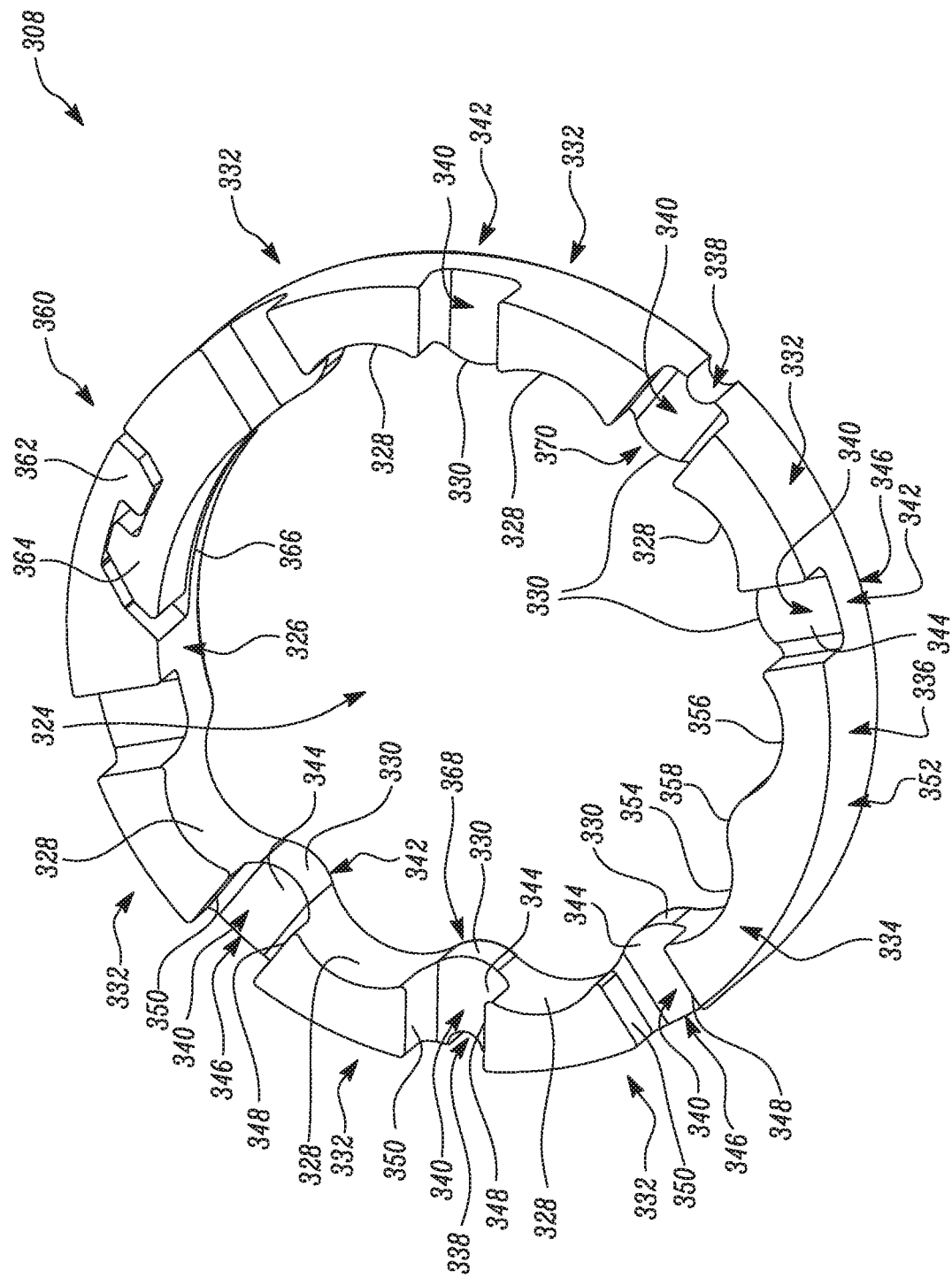
FIG. 4A is a perspective view of a sealing ring associated with the damper of FIG. 2.
Figure 4B:
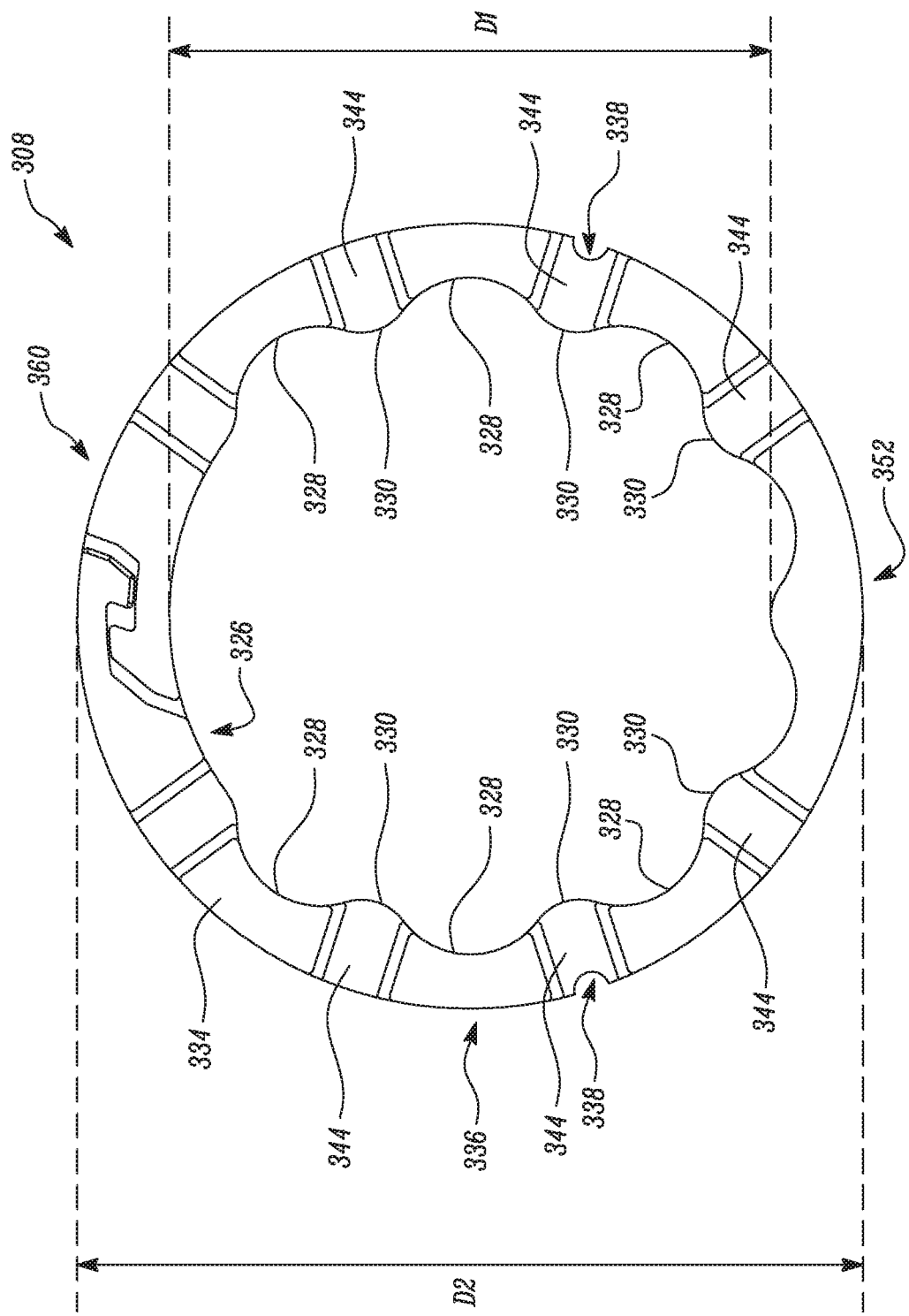
FIG. 4B is a top view of the sealing ring of FIG. 4A.
Figure 4C:
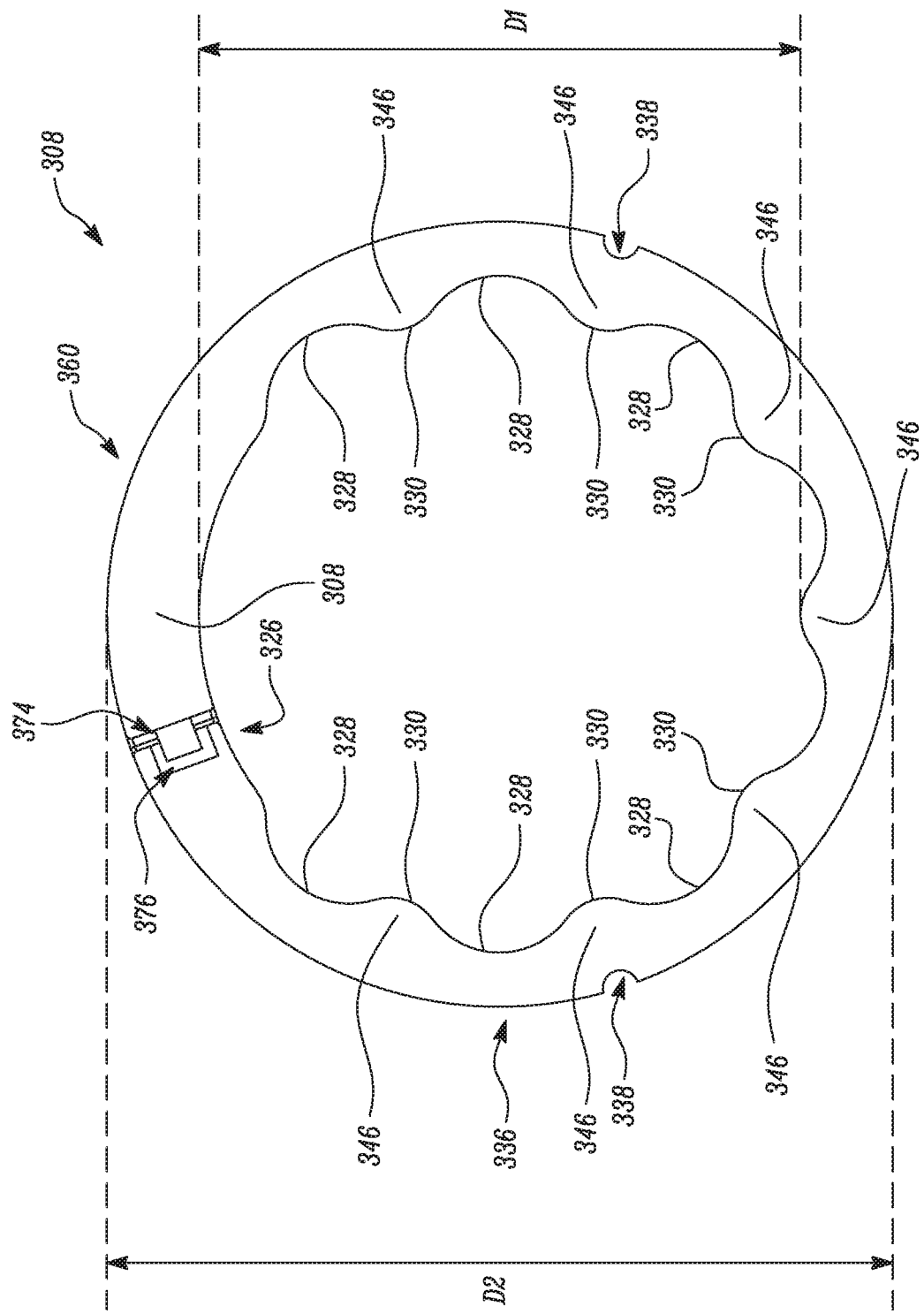
FIG. 4C is a bottom view of the sealing ring of FIG. 4A.

Referring to FIG. 4A, the sealing ring 308 defines a through opening 324 to receive the piston rod 134 (see FIGS. 2 and 3) therethrough. Further, the sealing ring 308 defines an inner surface 326. In an assembled condition of the damper 112, the inner surface 326 faces the piston rod 134. As shown in FIGS. 4B and 4C, the inner surface 326 defines an inner diameter "D1". The inner diameter "D1" is greater than or equal to an outer diameter of the piston rod 134 (see FIG. 3A). The inner surface 326 includes a plurality of concave surfaces 328 and a plurality of convex surfaces 330. Each of the plurality of concave surfaces 328 is located adjacent to the corresponding convex surface 330 of the plurality of convex surfaces 330. More particularly, the inner surface 326 includes six concave surfaces 328 and six convex surfaces 330. The inner surface 326 therefore includes alternating concave and convex surfaces 328, 330. However, a total number of the concave and convex surfaces 328, 330 may vary as per system requirements. Each concave surface 328 is curved away from the piston rod 134. Therefore, a space is defined between each concave surface 328 and the piston rod 134. Further, each convex surface 330 is curved towards the piston rod 134.

Figure 5:
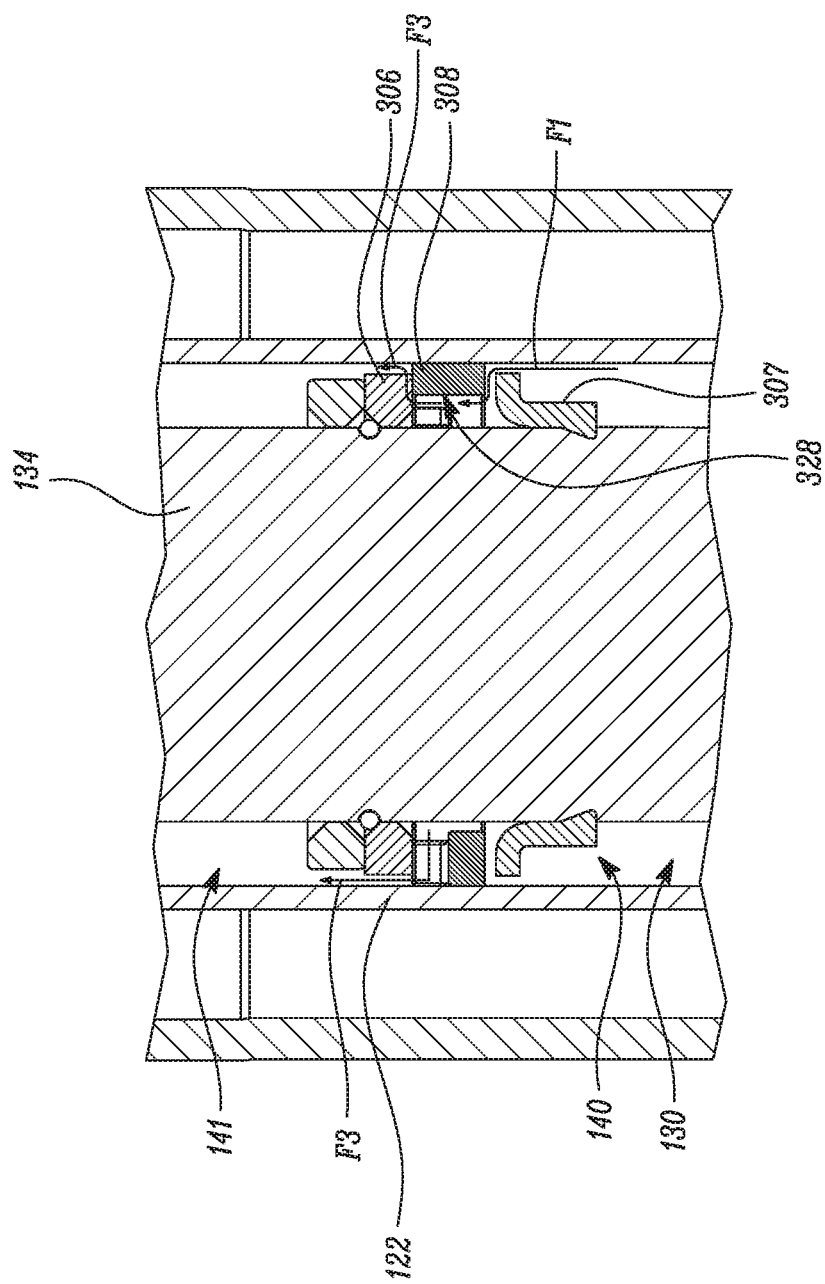
FIG. 5 is a cross-sectional view illustrating flow of fluid within the damper during a compression stroke of the damper of FIG. 2.

Referring now to FIG. 5, a cross-sectional view of the damper 112 during the compression stroke is illustrated. During the compression stroke, the sealing ring 308 may contact the first collar 306 and may be spaced apart from the second collar 307. As illustrated, each of the concave surfaces 328 defines a first flow path "F1" of fluid within a high pressure region 141 proximal to the first end 124 (see FIG. 2). The high pressure region 141 may correspond to a region defined in the rebound chamber 130 with a reduced diameter of the pressure tube 122. The reduced diameter may be generated by various processes, such as swaging. Alternatively, the pressure tube 122 may include a sleeve insert (not shown) instead of the swaged design of the pressure tube 122. Each of the concave surfaces 328 allows fluid flow through the space defined between each concave surface 328 and the piston rod 134. The first flow path "F1" allows fluid flow towards the first end 124. More particularly, during the compression stroke, the concave surfaces 328 allow fluid flow therethrough along the first flow path "F1".

Further, the concave surfaces 328 and channels 340 may allow fluid flow therethrough during the compression stroke and may assist in replenishing the rebound chamber 130. Further, when the damper 112 switches from the compression stroke to the rebound stroke, the concave surfaces 328 may not allow flow of fluid therethrough along the first flow path "F1" as the first flow path "F1" is restricted by the second collar 307. Thus, in such conditions, fluid may flow through the grooves 338 (see FIG. 4A) and a bleed path 374 (see FIGS. 4C and 4D). Moreover, during the rebound stroke, any fluid flow along the first flow path "F1" may be restricted by the second collar 307 and fluid may flow only through the grooves 338 and the bleed path 374. Further, the concave surfaces 328 may provide improved sealing of the sealing ring 308 against the pressure tube 122 which may in turn assist in approaching high peak damping forces thereby providing increased energy dissipation.

As shown in FIG. 4A, the sealing ring 308 further defines a plurality of first segments 332 spaced apart from each other. In the illustrated example, the sealing ring 308 includes six first segments 332. Each of the plurality of first segments 332 includes the corresponding concave surface 328 of the plurality of concave surfaces 328. The sealing ring 308 includes an outer surface 336 opposite to the inner surface 326. As shown in FIGS. 4B and 4C, the outer surface 336 defines an outer diameter "D2". The outer diameter "D2" is lesser than or equal to an inner diameter of the pressure tube 122 (see FIG. 3A). The outer surface 336 defines at least one groove 338. In the illustrated example, the outer surface 336 defines a pair of grooves 338. However, a total number of the grooves 338 may vary as per system requirements. It should be noted that the sealing ring 308 may include a single groove, two grooves, or three grooves based on tunability requirements of the damper 112. More particularly, a number of the grooves 338 and an area of the corresponding groove 338 may be varied to vary a peak damping force of the damper 112. Further, in some examples, the sealing ring 308 may be designed such that the sealing ring 308 does not include any of the grooves 338.

Figure 6:
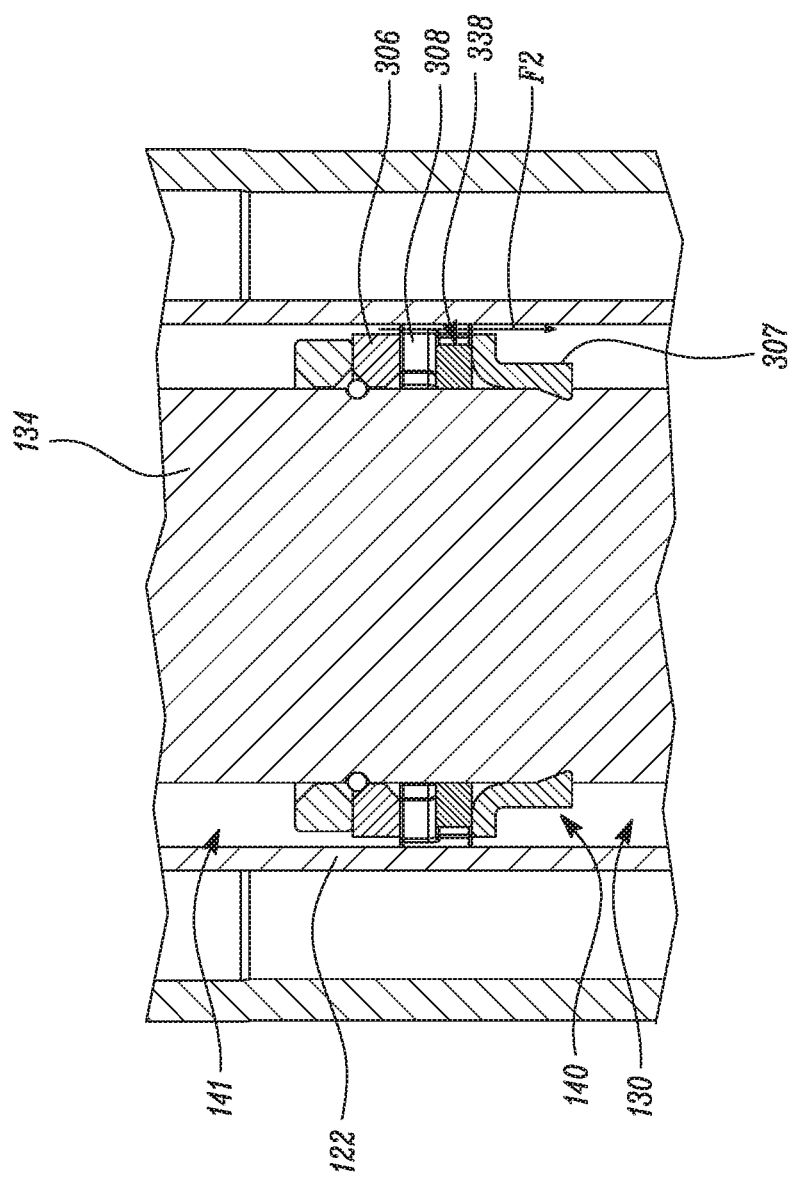
FIG. 6 is a cross-sectional view illustrating flow of fluid within the damper during a rebound stroke of the damper of FIG. 2.

Referring now to FIG. 6, a cross-sectional view of the damper 112 during the rebound stroke is illustrated. During the rebound stroke, the sealing ring 308 may contact the first and second collars 306, 307. As illustrated, each of the grooves 338 defines a second flow path "F2" of fluid within the high pressure region 141. More particularly, each of the grooves 338 allows fluid flow through a space between each of the grooves 338 and the pressure tube 122. The second flow path "F2" allows fluid flow towards the second end 126 (see FIG. 2). During the rebound stroke, as the pressure in the high pressure region 141 increases, the grooves 338 allow dissipation of kinetic energy. Accordingly, the damping force of the damper 112 increases and the velocity of the piston rod 134 may reduce thereby allowing reduction in noise. Further, when the damper 112 switches from the rebound stroke to the compression stroke, the concave surfaces 328 and the channels 340 may allow flow of fluid therethrough along the first and third flow paths "F1", "F3", respectively. Additionally, when the damper 112 switches from the rebound stroke to the compression stroke, the grooves 338 may also allow fluid flow therethrough along the second flow path "F2". Moreover, during the compression stroke, the grooves 338 are designed such that the grooves 338 may allow fluid flow therethrough.

As shown in FIG. 4A, the sealing ring 308 includes an upper surface 334 extending between the outer and inner surfaces 336, 326. The upper surface 334 defines the plurality of channels 340. Each of the plurality of channels 340 extends from the inner surface 326 to the outer surface 336. Further, each of the channels 340 defines a third flow path "F3" (shown in FIG. 5) of fluid. Each of the channels 340 allows fluid flow therethrough. The third flow path "F3" allows fluid flow towards the first end 124 (see FIG. 2). More particularly, each of the channels 340 receives the fluid that exits the space between each concave surface 328 and the piston rod 134 along the first flow path "F1". The fluid flowing along the third flow path "F3" may then exit the sealing ring 308 and flow towards the first end 124. During the compression stroke, the channels 340 allow dissipation of kinetic energy. Accordingly, the damping force of the damper 112 increases and the velocity of the piston rod 134 may reduce thereby allowing reduction in noise. Further, when the damper 112 switches from the compression stroke to the rebound stroke, the channels 340 may not allow flow of fluid therethrough along the third flow path "F3" as the third flow path "F3" is restricted by the second collar 307. Thus, in such conditions, fluid may only flow through the grooves 338 and the bleed path 374. Moreover, during the rebound stroke, any fluid flow along the third flow path "F3" may be restricted by the second collar 307 and fluid only flows through the grooves 338 and the bleed path 374.

Further, the sealing ring 308 defines a plurality of second segments 342, 368, 370 spaced apart from each other. In the illustrated example, the sealing ring 308 includes six second segments 342, 368, 370, each of the plurality of second segments 342, 368, 370 being adjacent to the corresponding first segment 332 of the plurality of first segments 332. Further, each of the plurality of second segments 342, 368, 370 includes the corresponding convex surface 330 of the plurality of convex surfaces 330, wherein one second segment 368 or 370 of the plurality of second segments 342, 368, 370 defines the at least one groove 338. Specifically, each of the second segments 368, 370 defines the groove 338. Further, the convex surfaces 330 of the sealing ring 308 allow centering of the sealing ring 308. More particularly, the convex surfaces 330 allow centering of the sealing ring 308 with respect to the piston rod 134. Thus, any misalignment of the sealing ring 308 with respect to the piston rod 134 may be eliminated, especially when the damper operates at a high pressure. Further, the convex surfaces 330 may provide improved sealing of the sealing ring 308 against the pressure tube 122.

Further, each of the plurality of second segments 342, 368, 370 includes a top surface 344 and a bottom surface 346 opposite to the top surface 344. The at least one groove 338 extends from the top surface 344 to the bottom surface 346 of the one second segment 368, 370. The bottom surface 346 may be substantially planar. In the illustrated example, the at least one groove 338 includes the plurality of grooves 338 defined on the outer surface 336 of the sealing ring 308. Each of the plurality of grooves 338 is defined by the corresponding second segment 368, 370 of the plurality of second segments 342, 368, 370. Moreover, each of the plurality of second segments 342, 368, 370 includes the top surface 344 and a pair of lateral surfaces 348, 350 extending upwardly from opposing sides of the top surface 344. Each of the plurality of channels 340 is defined by the top surface 344 and the pair of lateral surfaces 348, 350 of the corresponding second segment 342, 368, 370 of the plurality of second segments 342, 368, 370. Each channel 340 is substantially U-shaped. The sealing ring 308 also includes a third segment 352 disposed between two of the second segments 342. The third segment 352 includes a pair of concave surfaces 354, 356 and a convex surface 358 disposed between the pair of concave surfaces 354, 356. Each of the concave surfaces 254, 356 also defines a space through which fluid can flow during the rebound and compression strokes. Further, the convex surfaces 358 assist in centering of the sealing ring 308.

The sealing ring 308 further includes a locking mechanism 360 adapted to lock the sealing ring 308 around the piston rod 134. The locking mechanism 360 is disposed diametrically opposite to the third segment 352. The locking mechanism 360 includes a first tongue 362 and a second tongue 364. The first tongue 362 is adapted to engage with the second tongue 364 to lock the sealing ring 308 around the piston rod 134. Further, the locking mechanism 360 includes a projection 366 extending substantially parallel to the upper surface 334 of the sealing ring 308. As shown in FIG. 4D, the projection 366 is disposed below the first tongue 362 and the second tongue 364. More particularly, the projection 366 defines a land that is disposed beneath the locking mechanism 360. The projection 366 minimizes a leakage of fluid through a leakage path 372 that exists between the first and second tongues 362, 364. The projection 366 covers the leakage path 372 from below such that leakage of fluid is minimized.

The locking mechanism 360 also defines a bleed path 374. Further, the locking mechanism 360 includes a leakage prevention feature 376 (shown in FIG. 4C). The leakage prevention feature 376 eliminates any axial or radial leakage of fluid therethrough, thereby eliminating leakage of fluid through the bleed path 374. In an example, the leakage prevention feature 376 may include a first tab that couples with a second tab to seal the bleed path 374. It should be noted that the leakage prevention feature 376 described herein is exemplary in nature, and the leakage prevention feature 376 may include any other design features that allow sealing of the bleed path 374. The locking mechanism 360 is designed such that unintentional opening of the sealing ring 308 due to high hydraulic pressures during the operation of the damper 112 is eliminated.

The design of the sealing ring 308 associated with the damper 112 explained above may include a simplified construction and robust design and may be easy to manufacture. Further, the sealing ring 308 described above may be incorporated in the damper 112 at a lower cost as compared to existing sealing rings. The sealing ring 308 may improve durability and tunability of the hydraulic rebound end stop system 300. This design of the sealing ring 308 may be repeatable and consistent in performance. Additionally, an application of the damper 112 described herein is not restricted to vehicles and may be used in any application that incorporates a damper 112.

Referring to FIG. 2, as the piston 128 travels towards the first end 124 during the rebound stroke, the volume of the compression chamber 132 increases and the volume of the rebound chamber 130 decreases. As shown in FIG. 6, during the rebound stroke, the sealing ring 308 is held between the first collar 306 and the second collar 307 and any fluid flow along the first and third flow paths "F1", "F3" (see FIG. 5) is restricted. Further, due to decrease in the volume of the rebound chamber 130, the pressure in the rebound chamber 130 increases. As the pressure in the rebound chamber 130 increases, the sealing ring 308 allows controlled flow of fluid through the second flow path "F2" within the high pressure region 141. During the rebound stroke, the second flow path "F2" directs the fluid flow towards the second end 126 (see FIG. 2). Further, as the piston 128 moves from the rebound stroke to the compression stroke, the concave surfaces 328, the grooves 338, and the channels 340 may allow fluid flow therethrough.

Referring to FIG. 5, during the compression stroke, the upper surface 334 (see FIG. 4A) of the sealing ring 308 is in contact with the lower surface of the first collar 306. Further, an axial gap is defined between the sealing ring 308 and the second collar 307. During the compression stroke, the sealing ring 308 allows controlled flow of fluid through the first and third flow paths "F1", "F3" towards the first end 124 (see FIG. 2). More particularly, the concave surfaces 328 and the channels 340 allow fluid flow therethrough along the respective first and third flow paths "F1", "F3" within the high pressure region 141. Additionally, during the compression stroke, the grooves 338 are designed such that the grooves 338 may also allow fluid flow therethrough. As the piston 128 moves from the compression stroke to the rebound stroke, the concave surfaces 328 and the channels 340 may not allow fluid flow therethrough along the first and third flow paths "F1", "F3", respectively, as the flow paths "F1", "F3" are restricted by the second collar 307.

The sealing ring 308 allows controlled flow of fluid through the first, second, and third flow paths "F1", "F2", "F3" (see FIGS. 5 and 6) to dissipate some amount of kinetic energy thereby eliminating any hard stop of the piston rod 134. More particularly, provision of the concave surfaces 328, the grooves 338, and the channels 340 (see FIG. 4A) allow dissipation of kinetic energy. The dissipation of kinetic energy causes reduction in the velocity of the piston rod 134 thereby allowing reduction in noise generated by the damper 112 as well as reduction of forces experienced by various components of the vehicle.

Figure 7:
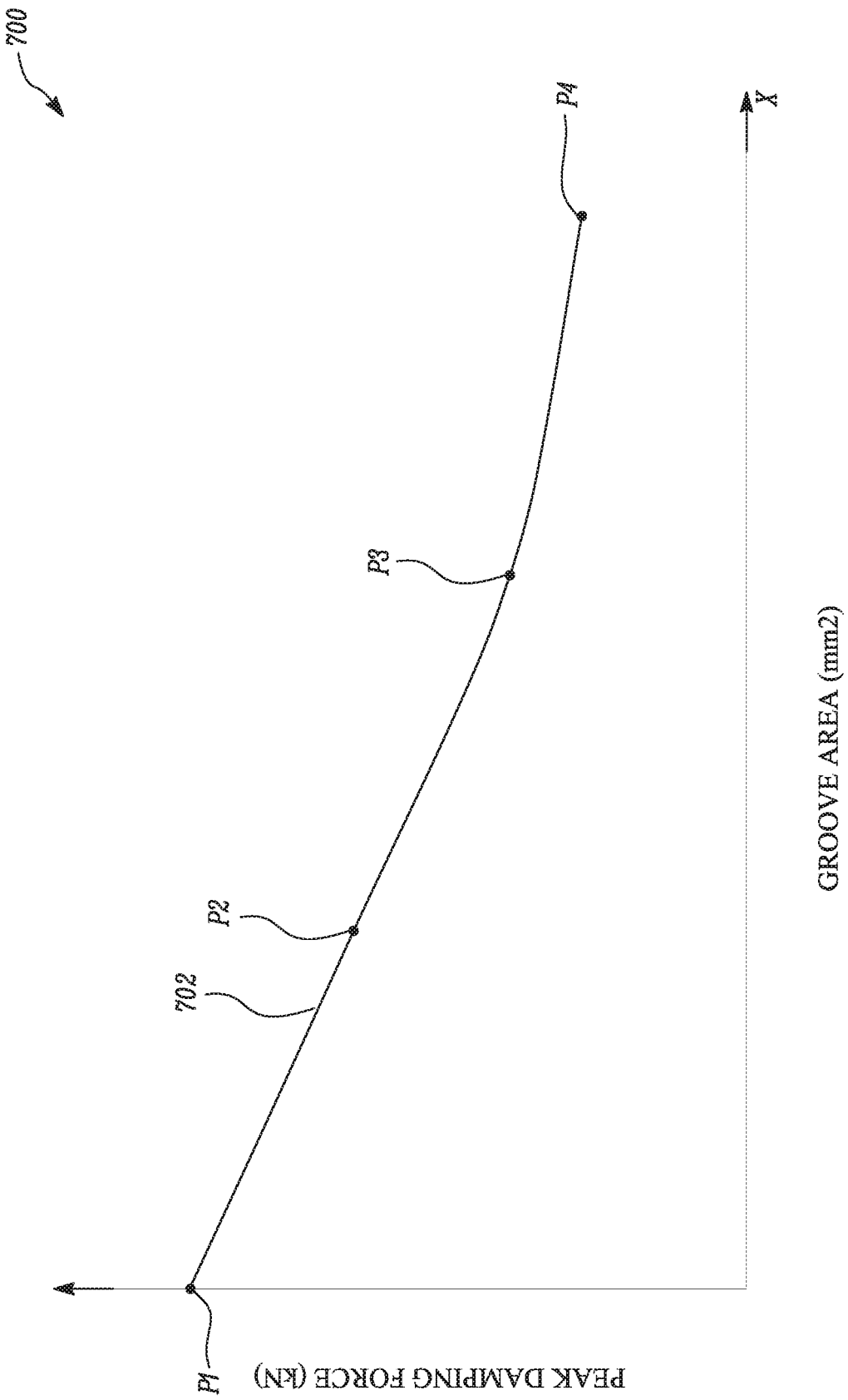
FIG. 7 is an exemplary plot illustrating peak damping forces for a sealing ring having different groove areas that are defined by grooves of the sealing ring.

FIG. 7 is an exemplary plot 700 illustrating peak rebound forces for a sealing ring 308 (see FIG. 4A) having different groove areas that is defined by grooves formed on the sealing ring 308. Exemplary groove areas in terms of square millimeters (mm2) is marked on the X-axis whereas peak damping forces in terms of kilonewton (kN) is marked on the Y-axis. The plot 700 is prepared by plotting results for the different groove areas. More particularly, the pattern 702 is generated by plotting points "P1", "P2", "P3", "P4" corresponding to different groove areas. As illustrated, the point "P1" corresponds to the sealing ring 308 with no grooves, thus the groove area is zero. Further, the point "P2" corresponds to the sealing ring 308 with a single groove, the point "P3" corresponds to the sealing ring 308 with two grooves, whereas point "P4" corresponds to the sealing ring 308 with three grooves. It can be concluded that as the groove area and/or number of grooves increases, the peak damping force of the damper 112 decreases. The number and/or area of the grooves may be tuned or adjusted as per application requirements.

Figure 8:
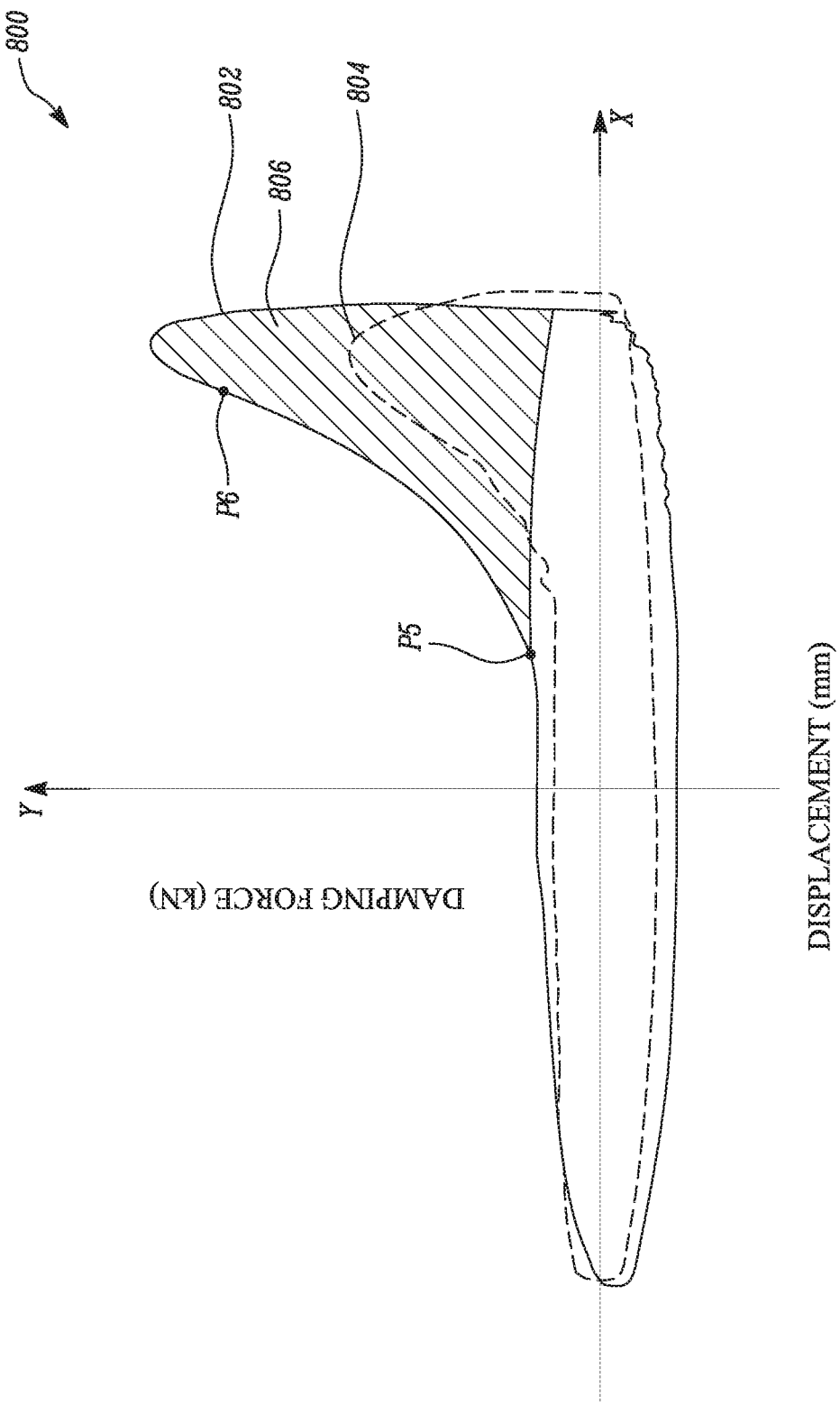
FIG. 8 is an exemplary plot illustrating benchmark comparison between two different sealing rings.

FIG. 8 is an exemplary plot 800 illustrating benchmark comparison between two different sealing rings. The plot 800 is generated by moving the piston rod 134 at a desired velocity and displacing the piston rod 134 by a desired displacement beyond a full rebound condition of the damper 112. Exemplary displacement of the sealing rings in terms of millimeters (mm) is marked on the X-axis whereas peak damping forces in terms of kilonewton (kN) is marked on the Y-axis.

The plot 800 is prepared by plotting results for two different sealing rings. More particularly, the pattern 802 is generated by plotting points corresponding to the sealing ring 308 shown in FIG. 4A whereas the pattern 804 is generated by plotting points corresponding to a conventional sealing ring. For pattern 802, point "P5" represents a hydraulic rebound end stop initial rate whereas point "P6" represents a hydraulic rebound end stop final rate. More particularly, the hydraulic rebound end stop initial rate and the hydraulic rebound end stop final rate correspond to an initial velocity and a final velocity, respectively, of the piston rod 134 that may be controlled based on the design of the sealing ring 308 in order to achieve desired tunability.

It can be concluded that at similar velocity of the piston rod 134 and similar piston rod displacement, the sealing ring 308 corresponding to the pattern 802 exhibits greater peak damping forces as compared to the sealing ring corresponding to the pattern 804. Further, energy dissipated by the damper 112 is represented by an area 806. Accordingly, it can be concluded that the energy dissipated by the damper 112 having the sealing ring 308 is greater than energy dissipated by the damper 112 having the conventional sealing ring.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A damper comprising:
a pressure tube defining a first end and a second end opposite to the first end;
a piston slidably disposed within the pressure tube, the piston defining a rebound chamber and a compression chamber within the pressure tube;
a piston rod adapted to reciprocate with the piston, wherein the piston rod is partially received within the pressure tube; and
a first collar disposed around the piston rod;
a second collar disposed around the piston rod and axially spaced apart from the first collar;
a snap ring disposed adjacent to the second collar and extending along a circumference of the piston rod, wherein the snap ring is at least partially received within a ring groove of the piston rod; and
a sealing ring slidably disposed around the piston rod and disposed between the first and second collars, the sealing ring including:
an inner surface facing the piston rod, the inner surface including a plurality of concave surfaces and a plurality of convex surfaces, each of the plurality of concave surface being located adjacent to a corresponding convex surface of the plurality of convex surfaces;
an outer surface opposite to the inner surface, the outer surface defining at least one groove; and
an upper surface extending between the outer and inner surfaces, the upper surface defining a plurality of channels.

2. The damper of claim 1, wherein each of the plurality of channels extends from the inner surface to the outer surface.

3. The damper of claim 1, wherein the sealing ring further comprises a locking mechanism adapted to lock the sealing ring around the piston rod.

4. The damper of claim 3, wherein the locking mechanism includes a first tongue and a second tongue, wherein the first tongue is adapted to engage with the second tongue to lock the sealing ring around the piston rod.

5. The damper of claim 4, wherein the locking mechanism further includes a projection extending substantially parallel to the upper surface of the sealing ring, wherein the projection is disposed below the first tongue and the second tongue.

6. The damper of claim 1 further comprising:
a plurality of first segments spaced apart from each other, each of the plurality of first segments including a corresponding concave surface of the plurality of concave surfaces; and
a plurality of second segments spaced apart from each other, each of the plurality of second segments being adjacent to a corresponding first segment of the plurality of first segments, each of the plurality of second segments including a corresponding convex surface of the plurality of convex surfaces, wherein one second segment of the plurality of second segments defines the at least one groove.

7. The damper of claim 6, wherein each of the plurality of second segments includes a top surface and a bottom surface opposite to the top surface, and wherein the at least one groove extends from the top surface to the bottom surface of the one second segment.

8. The damper of claim 6, wherein each of the plurality of second segments includes a top surface and a pair of lateral surfaces extending upwardly from opposing sides of the top surface, and wherein each of the plurality of channels is defined by the top surface and the pair of lateral surfaces of a corresponding second segment of the plurality of second segments.

9. The damper of claim 6, wherein the at least one groove includes a plurality of grooves defined on the outer surface of the sealing ring, and wherein each of the plurality of grooves is defined by a corresponding second segment of the plurality of second segments.

10. The damper of claim 6 further comprising a third segment disposed between two of the second segments, the third segment including a pair of concave surfaces and a convex surface disposed between the pair of concave surfaces.

* * * * *